Figure 1:
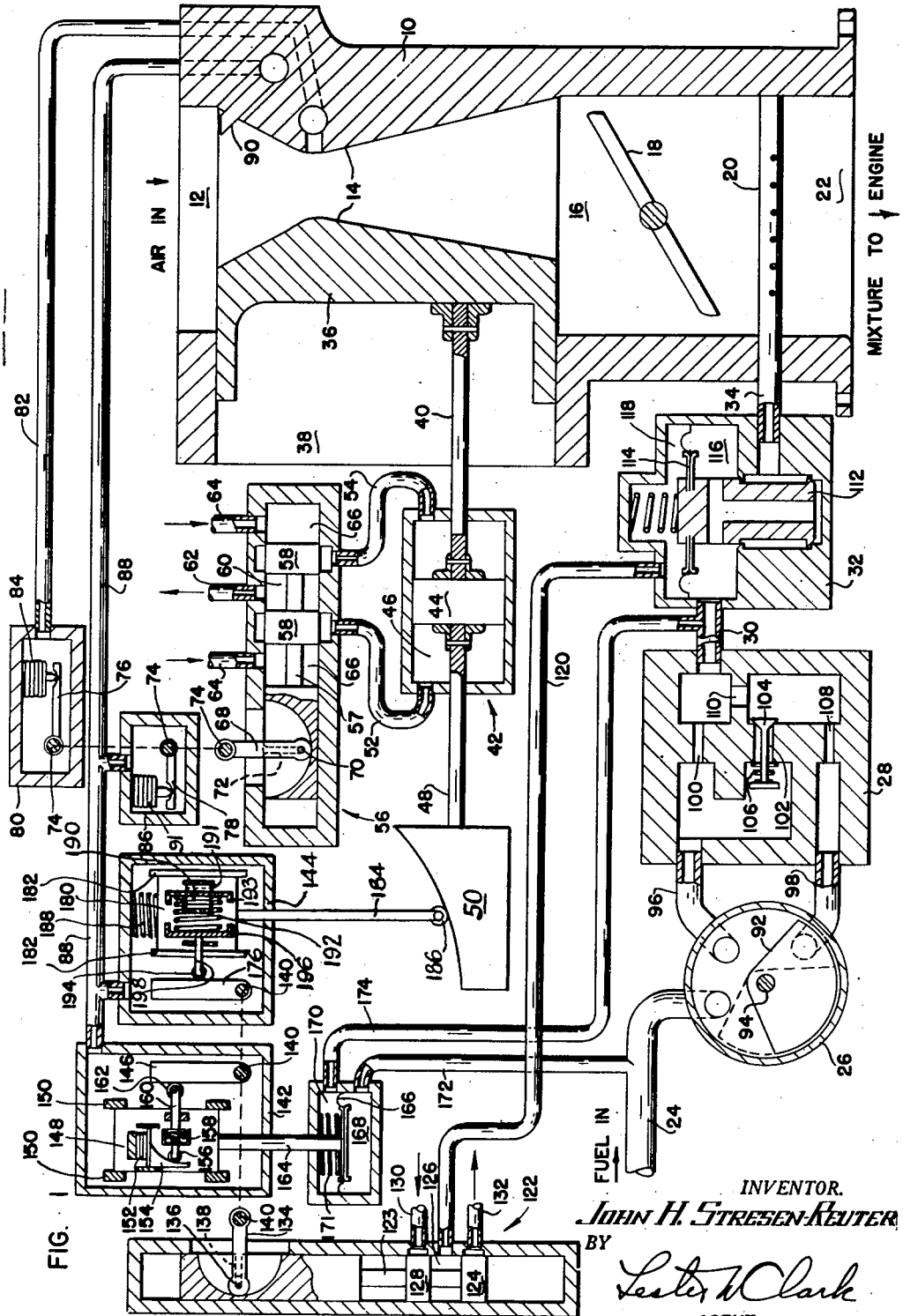

April 26, 1949. J. H. STRESEN-REUTER 2,468,416
CARBURETOR
Filed March 3, 1945 3 Sheets-Sheet 1

INVENTOR.
John H. Stresen-Reuter
BY Lester W. Clark
AGENT

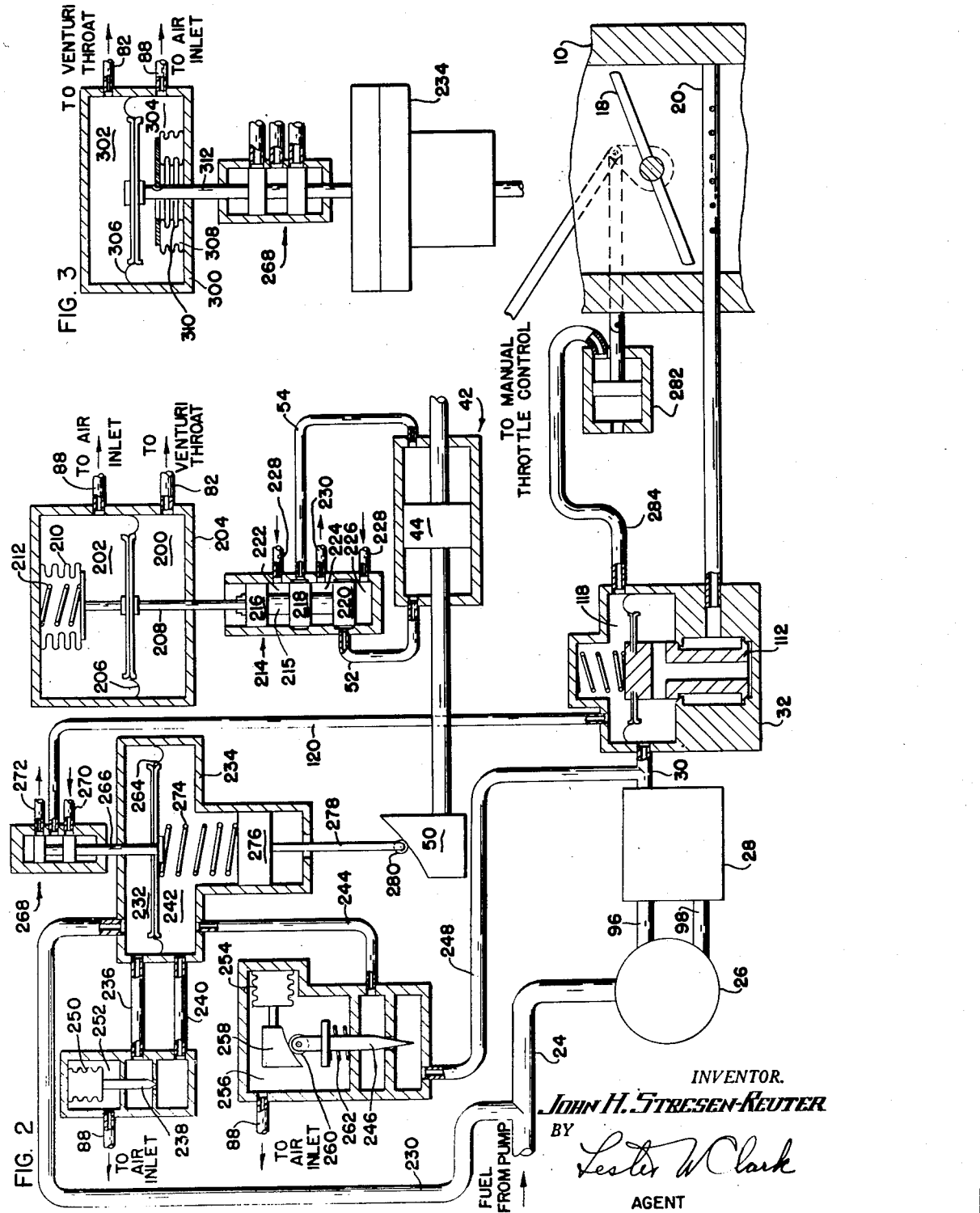

April 26, 1949. J. H. STRESEN-REUTER 2,468,416
CARBURETOR
Filed March 3, 1945 3 Sheets-Sheet 3

INVENTOR
John H. Stresen-Reuter
BY Lester W Clark
AGENT

Patented Apr. 26, 1949

2,468,416

UNITED STATES PATENT OFFICE 2,468,416

CARBURETOR

John H. Stresen-Reuter, Meriden, Conn., assignor, by mesne assignments, to Niles-Bement-Pond Company, West Hartford, Conn., a corporation of New Jersey Application March 3, 1945, Serial No. 580,872

14 Claims. (Cl. 261—34)

The present invention relates to carburetors for internal combustion engines, and particularly to carburetors for engines adapted for use on aircraft.

Present carburetors for aircraft use commonly measure the rate of flow of air to the engine by means of a fixed restriction of Venturi formation in the air induction passage. The pressure differential set up by this fixed restriction is used to control the fuel pressure differential across a fixed restriction in the fuel line, thereby controlling the fuel flow so as to make it proportional to the air flow. A substantially constant fuel-to-air ratio is thereby obtained.

In a carburetor adapted for use on a modern high-powered aircraft engine, the air flow varies over a very wide range, from a few hundred pounds of air per hour to 15,000 pounds or more of air per hour. The present trend in modern aircraft engines is to design them for higher and higher power output. As the power output increases, the required maximum air flow increases and hence the range of air flows over which the carburetor must function correctly increases. A given fixed restriction or venturi will measure flow correctly over a relatively limited range. If a carburetor air metering restriction is designed to measure correctly the desired maximum air flow, it is not accurate at small air flows. It is, therefore, common to provide other means for controlling the fuel-to-air ratio at low air flows. For example, the throttle position may be used to control the fuel-to-air ratio under such conditions.

In the Venturi type restrictions used on modern aircraft carburetors, it is common to measure the air flow by the use of the total (static plus impact) or dynamic pressure at the entrance to the restriction and the static pressure at the throat of the restriction. The pressure differential thereby obtained is greater, and hence the available measuring force is greater, than if the difference between the static pressures at the two points in question were used. Such a structure is more accurately described as an orifice, rather than a venturi. The tapered discharge passages are used in such orifices to limit the loss of pressure thru the restriction. In considering mathematically the laws of fluid flow thru such a restriction, it is necessary to use the laws developed for restrictions generally, rather than the special laws which apply to a Venturi meter. This is because of the fact that total pressure is measured at entrance.

The mass of air flowing per unit time thru a fixed restriction of ideal form may be determined from the following mathematical relationship which is shown in Marks, "Mechanical Engineers Handbook," third edition (1930), page 2057:

$$W = \frac{A_2 p_1}{\sqrt{T_1}} \sqrt{2g \frac{k}{k-1} \frac{1}{R} \left[ \left(\frac{p_2}{p_1}\right)^{\frac{2}{k}} - \left(\frac{p_2}{p_1}\right)^{\frac{k+1}{k}} \right]} \quad (1)$$

Where

W equals the mass of air flowing per unit time,
A equals cross-sectional area,
$p_1$ equals total (dynamic) pressure at the orifice entrance
$p_2$ equals static pressure at the orifice throat,
T equals temperature,
g equals 32.15,
k equals ratio of specific heat at constant pressure to specific heat at constant volume,
R equals gas constant,
Subscript 1 refers to conditions at the orifice entrance and
Subscript 2 refers to conditions at the orifice throat.

The above equation holds good only where the velocity of approach at the point of measurement is zero. In other words, the pressure measuring opening at the orifice entrance must receive the impact pressure of the entering air, so that the velocity of flow thru the pressure measuring passage is substantially zero.

Referring to the above equation, it may be seen that all the quantities under the radical are constant, except for the ratio $p_2/p_1$. This is the ratio of the pressure at the throat of the orifice to the entering air pressure. Therefore, it may be seen that if an orifice of variable throat area is constructed, and if its throat area is controlled to maintain the ratio of throat pressure to entering air pressure a constant for all air flows, then the above equation reduces to $$W = \frac{A_2 p_1}{\sqrt{T_1}} K \quad (2)$$

where K is a constant, determined not only by the quantity under the radical in Equation 1, but by the form of the orifice.

For constant density fluids, where variations in $p_1$ and $T_1$ have negligible effects, the equation further reduces to $$W = A_2 K_1 \quad (3)$$

where $K_1$ is another constant.

Therefore, if a variable orifice is constructed and controlled to maintain the ratio of throat pressure to entering pressure constant, the variation in the throat area may be used as a measure of the rate of flow of fluid passing thru it.

If such a device is used to measure the air flow in a carburetor, the pressure and temperature of the entering air are, of course, variable and so Equation 2, above, must be used.

In order to proportion the fuel flow to the air flow in a carburetor, it is usual to control the fuel pressure differential across a fixed metering restriction in the fuel line. The relationship between the rate of fuel flow and the pressure differential across the metering restriction may be expressed as follows:

$$F = K_2\sqrt{P_1 - P_2} \qquad (4)$$

Where
F equals the fuel flow in pounds per hour,
$K_2$ is a constant.
$P_1$ equals the fuel pressure on the upstream side of the metering orifice, and
$P_2$ equals the fuel pressure on the downstream side of the metering orifice.

If the fuel-to-air ratio is to be maintained constant, then the following relationship must hold. (This was obtained by dividing Equation 4 by Equation 2.)

$$\frac{F}{W} = \frac{K_2\sqrt{P_1 - P_2}\sqrt{T_1}}{A_2 p_1 K} = K_3 \qquad (5)$$

where $K_3$ is a constant

This may be expressed as:

$$\sqrt{P_1 - P_2} = \frac{K_3 A_2 p_1 K}{K_2 \sqrt{T_1}} \qquad (6)$$

which reduces to $$P_1 - P_2 = K_4 \frac{A_2^2 p_1^2}{T_1} \qquad (7)$$

where $K_4$ is a constant.

In other words, it may be stated that, in a carburetor where $A_2$ is varied to hold $p_2/p_1$ constant, then if the fuel pressure differential is controlled in response to the temperature ($T_1$) and the dynamic pressure ($p_1$) of the entering air, so that Equation 7 holds true, then the fuel-to-air ratio is constant.

It is an object of the present invention to provide improved fluid flow measuring apparatus based on the foregoing principles.

Another object is to provide such apparatus including a variable orifice and means for controlling the cross-sectional area of the orifice to maintain the ratio between throat and entrance pressures constant and including means for utilizing the area of the orifice throat as a measure of fluid flow.

A further object of the present invention is to provide an improved carburetor for an internal combustion engine.

A further object is to provide a carburetor including improved fluid flow measuring apparatus of the type described to measure the air flow.

A still further object is to provide in a carburetor, air flow measuring apparatus of the type described, and fuel flow controlling apparatus which will maintain the pressure drop across a fuel metering orifice proportional to the product of the square of the throat area of the variable orifice times the square of the entering air pressure divided by the entering air temperature.

Figure 4:
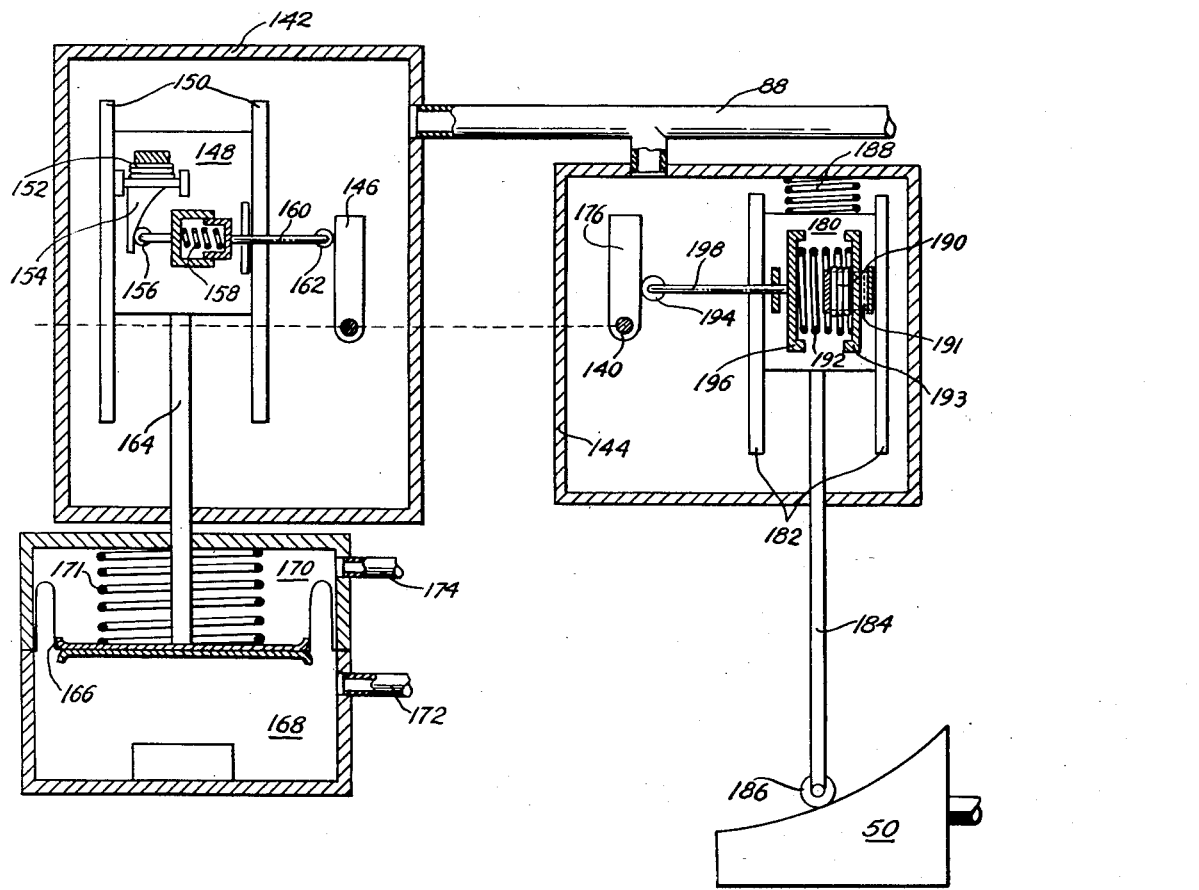

Other objects and advantages of the present invention will become apparent from a consideration of the appended specification, claims and drawing, in which Figure 1 is a somewhat diagrammatic illustration of a carburetor for an internal combustion engine constructed in accordance with the principles of my invention, Figure 2 illustrates a modified form of air flow measuring apparatus and fuel flow controlling apparatus which utilizes the principles of my invention, Figure 3 illustrates an acceleration responsive control device which may be used in connection with the apparatus of Figure 2, and Figure 4 illustrates a portion of the apparatus of Figure 1, on an enlarged scale.

Figure 1

There is shown in Figure 1 a carburetor body 10, forming a part of an air induction system for an internal combustion engine. Air enters the body 10 at an entrance 12, and flows past a Venturi type restriction 14 into a passage 16, past a throttle 18 and a fuel discharge nozzle 20 to an air outlet 22.

Fuel enters the carburetor from a constant pressure discharge pump (not shown) and flows thru a conduit 24, a mixture control 26, a jet system 28, a conduit 30, a fuel flow regulator valve 32, and a conduit 34 to the fuel discharge nozzle 20.

The air passage 16 and the Venturi restriction 14 are preferably of rectangular cross-section. The Venturi restriction 14 is formed on one side by a fixed portion of the body 10 and on the other side by a movable wall member 36. The wall member 36 is slidably mounted in a recess 38 formed in one wall of the body 10, so that it may be moved in and out to vary the cross-sectional area at the throat of venturi 14.

A rod 40 is attached by any suitable means to the wall member 36. The rod 40 is driven by a fluid servo-motor 42. The motor 42 includes a piston 44 moving in a cylinder 46. The surface of piston 44 opposite rod 40 is connected to another rod 48 which carries on its opposite end a cam member 50. The ends of the cylinder 46 receive fluid under pressure thru conduits 52 and 54.

Fluid under pressure is selectively supplied to the conduits 52 and 54 by means of a control valve mechanism generally indicated at 56. The valve mechanism 56 includes a piston valve 57 having a pair of lands 58 which normally close ports leading to the conduits 52 and 54. Between the lands 58 is a recess 60. A port leading to a drain conduit 62 opens into the recess 60. Other ports leading to pressure fluid supply conduits 64 open into similar recesses 66 on the opposite sides of the lands 58. The valve 56 is reciprocated by an arm 68 bearing a pin 70 which moves in a slot 72 in the valve 56.

The arm 68 is fixed on a shaft 74. Also attached to shaft 64 are a pair of lever arms 76 and 78. The lever arm 76 is located inside a casing 80. The interior of casing 80 is connected thru a conduit 82 to a port in the wall of body 10 which opens into the throat of venturi 14. An evacuated, collapsible bellows 84 in the casing 80 acts on the lever arm 76 with a force which is inversely proportional to the pressure at the throat of venturi 14.

The lever arm 78 is located in a casing 86, which is connected thru a conduit 88 to an impact tube 90, whose open end lies in a plane perpendicular to the path of movement of the air flowing into the entrance 12. A bellows 91 in the casing 86 acts on the end of lever arm 78 with a force inversely proportional to the pressure at the entrance to the venturi 14. It should be noted that the lever arms 76 and 78 are of different lengths.

The mixture control 26 includes a disc valve 92 fixed on a shaft 94. The disc valve 92 controls the flow of fuel thru ports opening into conduits 96 and 98 leading into the jet system 28. When the disc valve 92 is in the position illustrated in full lines in the drawing, fuel can flow to the jet system only thru the conduit 96. This full line position of the disc valve 92 is known as the "lean" position of the mixture control 26. When the disc valve 92 is in the dotted line position shown in the drawing, fuel can flow thru both the conduits 96 and 98. The dotted line position of disc valve 92 is termed the "rich" position of the mixture control. The disc 92 can also be moved to a "cut-off" position wherein it cuts off the flow of both conduits 96 and 98.

The conduit 96 conducts fuel either thru a fixed restriction or jet 100, or thru a restriction 102 controlled by an enrichment valve 104 biased to closed position by a spring 106. The conduit 98 conducts fuel to a fixed restriction 108. Fuel flowing thru the restrictions 102 and 108 also flows thru another restriction 110 which limits the total flow thru restrictions 102 and 108. The enrichment valve 104 is normally closed, but opens at high fuel pressure differentials across the jet system to increase the fuel-to-air ratio under heavy load conditions.

The fuel regulator 32 includes a valve 112 attached to the center of a diaphragm 114 which separates a pair of expansible chambers 116 and 118. The chamber 116 receives fuel from the conduit 30 at the pressure existing on the downstream side of the jet system. The chamber 118 is connected thru a conduit 120 to a valve mechanism 122. The valve mechanism 122 includes a piston valve 123 having a pair of lands 124 and 128 separated by a recess 126. The conduit 120 is connected to a port which opens into the recess 126. The land 128 normally closes a port leading to a pressure fluid supply conduit 130. The land 124 normally closes a port leading to a fluid drain conduit 132. The valve 123 is reciprocated by an arm 134 carrying a pin 136 which moves in a slot 138 in the valve 123. The arm 134 is attached to a shaft 140, which extends thru a pair of casings 142 and 144.

In the casing 142 the shaft 140 carries an arm 146. The interior of casing 142 is connected thru conduit 88 to the Venturi entrance. A plate 148 is mounted in the casing 142 to slide between guides 150 in a direction generally parallel to the lever arm 146. The plate 148 carries an expansible bellows 152. The upper end of this bellows is fixed with respect to the plate 148 and its lower end carries a cam 154. The bellows 152 is evacuated or filled with a fluid having a negligible coefficient of thermal expansion so that the position of its free end varies with the pressure of the air in the casing 142. The cam 54 acts thru a follower 156 and a spring 158 on a rod 160 which carries a roller 162 engaging the lever arm 146. The cam 154 is contoured in accordance with the conventional inverse curve $$\left(x = \frac{k^1}{y}\right)$$

where $y$ equals the horizontal distance from a fixed datum traveled by follower 156, and $x$ equals the vertical distance traveled by cam 154 from a datum corresponding to zero pressure. Therefore the travel of follower 156 varies inversely with the pressure in casing 142. The position of follower 156 determines the loading of spring 158, since the horizontal position of the opposite end of spring 158 is fixed under all steady conditions of the system. The force applied to lever 146 is the same as the loading of spring 158, and hence varies inversely with the pressure in casing 142.

The plate 148 is positioned within the casing 142 by a rod 164, whose opposite end is attached to a diaphragm 166 separating a pair of expansible chambers 168 and 170. The chamber 168 is connected thru a conduit 172 to the fuel line on the upstream side of the jet system and the chamber 170 is connected thru a conduit 174 to the fuel conduit 30 on the downstream side of the jet system.

The interior of casing 144 is also connected to conduit 88 and is thereby subject to the air pressure existing at the entrance to the venturi. Inside the casing 144 is a lever arm 176 attached to shaft 140. A plate 180 is mounted in the casing 144 to reciprocate vertically in guides 182. The plate 180 is reciprocated by a rod 184 carrying a roller 186 which engages cam 50. A spring 188 inside the casing 144 biases the roller 186 into engagement with the cam surface. The plate 180 carries a bracket 191 supporting a flexible bellows 190 which positions a spring retainer 193 and thereby controls the tension on a spring 192 held in compression between retainer 193 and another retainer 196 fixed on a rod 198 which carries a roller 194 engaging the lever arm 176. The bellows 190 is filled with a fluid having an appreciable coefficient of thermal expansion, so that it varies the force acting thru roller 194 on the arm 176 directly in accordance with the entrance pressure $p_1$ and inversely in accordance with the temperature $T_1$. In other words, if the pressure inside casing 144 increases or the temperature decreases, the bellows 190 collapses slightly, moving retainer 193 to the left and increasing the loading of spring 192. This increases the force applied thru roller 194 to the lever 176. Since the position of lever 176 and hence the position of the retainer 196 are fixed for all steady conditions of the system, it may be seen that the bellows 190 varies the force applied to lever arm 176 directly with the pressure and inversely with the temperature in casing 144. If desired, the casing 144 may be placed directly in the air entrance so that the temperature of the air within it follows the entrance temperature $T_1$ closely.

*Operation of Figure 1*

The valve mechanism 56 is operated by the lever arms 76 and 78 to maintain a constant ratio between the entrance and throat pressures at the venturi 14. It may be seen that when the forces acting on the lever arms 76 and 78 are balanced, then $$\frac{1}{p_1}d_1 = \frac{1}{p_2}d_2$$

or $$\frac{p_2}{p_1} = \frac{d_2}{d_1} = K_5 \qquad (8)$$

where $d_1$ is the length of lever arm 78, $d_2$ is the length of lever arm 76, and $K_5$ is a constant.

If the forces acting on the lever arms 76 and 78 become unbalanced, then the valve 56 is moved in a direction to cause operation of a servo-motor 42 to change the area of the throat of venturi 14 and thereby to restore the balanced condition on the lever arms 76 and 78. For example, if the entrance pressure becomes too great with respect to the throat pressure, then the shaft 74 is rotated clockwise, and the valve 56 is moved to the left, allowing fluid under pressure to enter the right end of cylinder 46, from conduit 64, and connecting the left end of cylinder 46 to the drain 62. The pressure differential thereby applied to piston 44 moves it to the left, carrying with it the wall member 36 and increasing the area at the throat of venturi 14. This causes an increase in the pressure at the Venturi throat. This action continues until the pressure at the Venturi throat is increased sufficiently to restore the balanced condition to the lever arms 76 and 78, at which time the shaft 74 is restored to its neutral position, as shown in the drawings. This cuts off the supply of fluid to servo-motor 42 and stops the motion of the wall member 36.

Therefore, the ratio between the entrance and throat pressures is maintained constant by the mechanism described. The lateral position of cam 50 is a measure of the area of the Venturi throat, and if a fluid of constant density were being measured, its position would indicate the rate of flow thru the venturi.

The cam 50 is contoured so that the distance of rod 184 and plate 180 from a datum point corresponding to complete closure of the venturi 14 varies as the square of the area at the Venturi throat. The force applied to the lever arm 176 by the bellows 190 varies directly with the pressure and inversely with the temperature in the casing 144. Therefore, the torque applied to shaft 140 by lever 176 is proportional to $$\frac{p_1}{T_1}A_2^2$$

The distance between roller 162 in casing 142 and the axis of shaft 140 is proportional to the fuel pressure differential, which acts on diaphragm 166. The force applied to lever 146 thru roller 162 varies inversely with the pressure of the air in casing 162. It may therefore be said that the torque applied to shaft 140 by lever arm 146 is proportional to $$\frac{1}{p_1}(P_1-P_2)$$

When the two torques applied to shaft 140 by levers 146 and 176 are balanced, the valve 122 remains in the neutral position shown in the drawing. If the two torques become unbalanced, the valve 122 is moved in a direction to vary the fuel pressure differential to correct the unbalance. For example, if the torques become unbalanced so that the shaft 140 moves clockwise, the valve 122 is moved upwardly, allowing pressure fluid to enter the chamber 118 and thereby to move the valve 112 in a closing direction. This decreases the fuel flow, and thereby decreases the fuel pressure differential, so that the spring 171 moves diaphragm 166 downwardly, decreasing the moment arm of the force applied to lever arm 146, and thereby decreasing the clockwise torque acting on shaft 140. This action continues until the torques applied to shaft 140 by the levers 146 and 176 are again balanced.

It may therefore be seen that the fuel flow controlling mechanism described maintains a relationship which may be expressed as follows:

$$\frac{p_1}{T_1}A_2^2 = K_6\frac{1}{p_1}(P_1-P_2) \qquad (9)$$

or, $$P_1-P_2 = K_6\frac{p_1^2 A_2^2}{T_1} \qquad (10)$$

Equation 10 is identical with Equation 7, above. Therefore, since it has already been shown that $A_2$ is controlled to maintain $p_2/p_1$ constant, the carburetor shown in Figure 1 operates to maintain a constant fuel-to-air ratio.

Figure 2

There is shown in Figure 2 a carburetor which operates on the same principles as that of Figure 1, but in which the mechanism for operating the servo-motor 42, which regulates the area of the throat of the restriction, and the mechanism which controls the pressure in chamber 118 of fuel regulator 32 are different.

In Figure 2, those elements which are the same as corresponding elements in Figure 1 have been given the same reference numerals, and will not be further described.

In Figure 2, the conduits 82 and 88, connected to the Venturi throat and the air inlet, respectively, lead to a pair of chambers 200 and 202 in a casing 204. The chambers 200 and 202 are separated by a flexible diaphragm 206. A valve stem 208 is attached to the center of the diaphragm 206. The valve stem 208 extends thru the diaphragm 206, and is connected at its upper end to the free end of an expansible bellows 210, which is evacuated, and may be provided with an internal spring 212. The spring 212 is chosen so that its force, at the equilibrium position shown in the drawing, is equal and opposite to the spring force of bellows 210. The lower end of stem 208 operates a piston valve mechanism 214, including a valve 215 having three lands 216, 218 and 220, separating recesses 222, 224 and 226. The recesses 222 and 226 are connected to fluid pressure inlet conduits 228 and the recess 224 is connected to a fluid drain conduit 230.

A by-pass conduit is provided across the jet system 28 in the fuel line. This by-pass conduit may be traced from the fuel inlet conduit 24 thru a conduit 230 a chamber 232 in a casing 234, a conduit 236, past a valve 238, a conduit 240, a chamber 242 in the casing 234, a conduit 244, past a valve 246, and thru a conduit 248 to the main fuel conduit 30 on the downstream side of the jet system.

The valve 238 is operated by a bellows 250 located in a chamber 252 which is connected by the conduit 88 to the air entrance. The valve 238 is therefore positioned in accordance with the air entrance pressure. The area of the orifice around the valve varies directly as the air entrance pressure.

The valve 246 is operated by a bellows 254 located in a chamber 256, which is also connected to the air entrance thru conduit 88. The bellows 254 positions a cam 258. A roller 260 mounted on the stem of valve 246 cooperates with the cam 258. A spring 262 maintains the roller 260 in engagement with cam 258.

The bellows 254 is filled with a fluid having an appreciable coefficient of thermal expansion and the cam 258 is contoured in accordance with a square root function so that valve 246 is positioned in accordance with the square root of the temperature at the entrance to the variable Venturi restriction. The area of the orifice at valve 246 therefore varies with the square root of the air entrance temperature.

The chambers 232 and 242 are separated by a diaphragm 264, which is attached at its center to the stem 266 of a piston valve mechanism 268. The valve mechanism 268 selectively connects the conduit 120 leading to chamber 118 of fuel regulator 32 either to a fluid pressure supply conduit 270 or to a fluid drain conduit 272.

A spring 274 under the diaphragm 264 biases the latter and the valve 268 upwardly. A piston 276 positions the lower end of spring 274, thereby controlling the load applied by it to diaphragm 264. A rod 278 attached to piston 276 carries a roller 280 which engages the cam 50.

Operation of Figure 2

When the forces acting on diaphragm 206 and bellows 210 are in a condition of equilibrium, the valve 214 is located in the position shown, wherein no fluid is supplied to the servo-motor 42 and the Venturi throat area therefore remains constant. Under these conditions, the forces acting upwardly on the valve stem 208 may be equated to the forces acting downwardly, as follows:

$$p_2 A_3 + p_1 A_4 = p_1 A_3 \quad (11)$$

$$p_1(A_4 - A_3) = p_2 A_3 \quad (12)$$

where $A_3$ equals the area of diaphragm 206 and $A_4$ equals the area of the end of bellows 210 which may be written in the form $$\frac{p_1}{p_2} = -\frac{A_3}{A_4 - A_3} = \frac{A_3}{A_3 - A_4} = K_7 \quad (13)$$

where $K_7$ is a constant.

It may, therefore, be seen that the ratio between the throat pressure and the entrance pressure is constant when the valve 214 is in its neutral position. Furthermore, if the ratio between those pressures changes so that valve 214 is moved from its neutral position, then the servo-motor responds to change the Venturi throat area to restore the ratio between the entrance and throat pressures to its proper value. For example, if the Venturi throat pressure decreases, the valve stem 208 is moved downwardly, allowing fluid under pressure to enter thru conduit 228, recess 222, conduit 54, to the right end of the cylinder of servo-motor 42. At the same time, the left end of the cylinder is connected thru conduit 52 and recess 224 to drain conduit 230. The piston of the servo-motor, therefore, moves to the left, increasing the Venturi throat area and thereby the pressure at the Venturi throat until the ratio again resumes its desired value.

Considering now the fuel flow controlling mechanism, it may be seen that the force due to spring 274 acting upwardly on diaphragm 264, when the valve 268 is in its neutral position, is the loading of the spring at that position. The spring loading is equal to the rate of the spring, which may be represented by J, times the distance between a datum position of piston 276 and its position as shown in Figure 2. That datum position of piston 276 and follower 280 corresponds to the position of cam 50 when the area of the variable Venturi throat is zero. The spring 274 is designed to have zero loading under such directions. The cam 50 is contoured so that as it travels through a distance proportional to the Venturi throat area ($A_2$), the follower 280 and piston 276 travel through a distance proportional to ($A_2^2$). Hence it may be stated that the loading of spring 274 is equal to $K_8 A_2$ squared times J, the rate of the spring 274, where $K_8$ is a constant. Therefore, equating the forces acting upwardly on valve stem 266 to the forces acting downwardly, it may be said that $$K_8 A_2^2 J + P_3 A_5 = P_1 A_5 \quad (14)$$

where $P_3$ equals the fuel pressure in chamber 242, and $A_5$ equals the area of diaphragm 264. If it is assumed that J is constant and that $$K_9 = \frac{J K_8}{A_5}$$

then $$P_1 - P_3 = K_9 A_2^2 \quad (15)$$

The fuel flow thru the by-pass conduit is equal to the square root of the pressure drop across valve 238 times the area of the orifice around that valve. This may be expressed as $$Q = K_{10} A_6 \sqrt{P_1 - P_3} \quad (16)$$

where Q is the rate of fuel flow thru the by-pass conduit, and $A_6$ equals the area of the orifice at valve 238.

Q is also equal to the square root of the pressure drop across the valve 246 times the area of the orifice around that valve. This may be expressed as $$Q = K_{11} A_7 \sqrt{P_3 - P_2} \quad (17)$$

where $K_{11}$ is a constant, and $A_7$ equals the area of the orifice at valve 246.

Setting these last two equations equal to each other it may be seen that $$K_{10} A_6 \sqrt{P_1 - P_3} = K_{11} A_7 \sqrt{P_3 - P_2} \quad (18)$$

$$K_{10}^2 A_6^2 (P_1 - P_3) = K_{11}^2 A_7^2 (P_3 - P_2) \quad (19)$$

$$\frac{K_{10}^2 A_6^2}{K_{11}^2 A_7^2}(P_1 - P_3) = P_3 - P_2 = (P_1 - P_2) - (P_1 - P_3) \quad (20)$$

$$P_1 - P_2 = \left(\frac{K_{10}^2 A_6^2}{K_{11}^2 A_7^2} + 1\right)(P_1 - P_3) \quad (21)$$

but $$A_6 = p_1 K_{12} \text{ and } A_7 = K_{13} \sqrt{T_1}$$

also, from 15 above, $$P_1 - P_3 = K_9 A_2^2$$

therefore, 21 may be written $$P_1 - P_2 = \left(\frac{K_{10}^2 K_{12}^2 p_1^2}{K_{11}^2 K_{13}^2 T_1} + 1\right) K_9 A_2^2 \quad (22)$$

Let $$K_{14} = \frac{K_{10}^2 K_{12}^2}{K_{11}^2 K_{13}^2} \quad (23)$$

Substituting Equation 23 in 22, we get $$P_1 - P_2 = \left(K_{14} \frac{p_1^2}{T_1} + 1\right) K_9 A_2^2 \quad (24)$$

which may be written $$P_1 - P_2 = K_{14} K_9 \frac{p_1^2 A_2^2}{T_1} + K_9 A_2^2 \quad (25)$$

Equation 25 shows the actual relationship between the variables concerned which is obtained by the structure of Figure 2. It should be compared with Equation 7, which represents the relationship between those variables which will give a constant fuel-to-air ratio. Such a comparison shows that Equation 25 differs from Equation 7 in the presence of the second term on the right hand side of Equation 25, which is absent from Equation 7. However, by proper design of the apparatus, $K_{14}$ may be made very large as compared to $K_9$, so that the percentage error introduced by the extra term in Equation 25 may be made negligible. In other words, the percentage variation of the actual fuel-air ratio obtained by this apparatus from the ideal constant fuel-air ratio, may be negligibly small.

Therefore, the fuel flow is maintained substantially proportional to the air flow as long as the valve 268 is in its position of equilibrium. Furthermore, if this position is disturbed, the fuel regulator 32 is operated to vary the fuel flow until the condition of equilibrium is restored. For example, if the fuel flow increases above the desired proportion, then the pressure drop across the valve 238 increases. This is applied to diaphragm 264 and moves valve 268 downwardly, allowing fluid under pressure to enter the chamber 118 of regulator 32 thru conduit 270 and conduit 120. This moves the valve 112 toward closed position, thereby decreasing the fuel flow to the desired value.

There is also provided in Figure 2, an arrangement for temporarily increasing the fuel supply upon acceleration of the engine. This includes a pump 282 connected to the throttle operating lingage, so that upon open movement of the throttle the pump sucks fluid thru a conduit 224 from the chamber 118, thereby temporarily decreasing the pressure in that chamber, and thereby opening the valve 112 to provide an additional fuel supply temporarily.

Figure 3

Figure 3 shows an alternative form of acceleration control device which may be used instead of the pump 282 of Figure 2. If desired, both the device shown in Figure 3 and the pump 282 of Figure 2 may be used.

In Figure 3, a casing 300 contains a pair of expansible chambers 302 and 304, separated by a flexible diaphragm 306. The chamber 302 is connected thru conduit 82 to the Venturi throat, and chamber 304 is connected thru conduit 88 to the air entrance. A pair of concentric bellows 308 and 310 are located within the chamber 304. The space between the two bellows is evacuated, and their free ends are attached to each other and to a stem 312, which is also attached to the center of diaphragm 306. This mechanism is substantially the same as that shown in casing 304 of Figure 3. It responds to the ratio between the pressures at the entrance and throat of the venturi. The stem 312 is attached to valve mechanism which may be the valve 268 of Figure 3.

When the ratio between the entrance and throat pressures departs from its desired value, an additional force is applied to the servo-motor controlling valve 268 to give a more rapid response and a more quickly increased or decreased fuel flow.

While I have shown and described certain preferred embodiments of my invention, other modifications thereof will readily occur to those skilled in the art, and I therefore intend my invention to be limited only by the appended claims.

I claim as my invention:

1. Fluid flow measuring apparatus, comprising a conduit for said fluid, a restriction in said conduit, means for varying the cross-sectional area of the throat of said restriction, reversible motor means for operating said area varying means, control means for said motor means including a control member having a normal position in which said motor means is stationary and effective upon movement from said position in opposite directions to cause operation of said motor means in opposite directions, a shaft for positioning said member, means for operating said shaft including a pair of lever arms fixed thereon, means responsive to the pressure at the entrance to said restriction for applying a force to one of said lever arms, means responsive to the pressure at the throat of said restriction for applying a force to the other lever arm, said pressure responsive means being effective to position said control member and thereby said area varying means to maintain a constant ratio between said entrance and throat pressures whose magnitude is determined by the relative lengths of said lever arms, an element to be positioned in accordance with the rate of fluid flow through said restriction, and means connecting said element to said area varying means for concurrent movement therewith.

2. Fluid flow measuring apparatus, comprising a conduit for said fluid, a restriction in said conduit means for varying the cross-sectional area of the throat of said restriction, reversible motor means for operating said area varying means, control means for said motor means including a control member having a normal position in which said motor means is stationary and effective upon movement from said position in opposite directions to cause operation of said motor means in opposite directions, a pair of expansible chambers separated by a movable wall, a first passage connecting one of said chambers to the throat of said restriction, a second passage connecting the other of said chambers to the air conduit at a point spaced from said throat, an evacuated flexible bellows in said other chamber opposite said wall and having an end area less than that of said wall, and means connecting said wall and said bellows to said control member for positioning the same, said bellows and wall being effective to position said control member and thereby said area varying means to maintain a constant ratio between said entrance and throat pressures whose magnitude is determined by the relative areas of said wall and bellows, an element to be positioned in accordance with the rate of fluid flow through said restriction, and means connecting said element to said area varying means for concurrent movement therewith.

3. Fluid flow measuring apparatus, comprising a conduit for said fluid, a restriction in said conduit, means for varying the cross-sectional area of the throat of said restriction, reversible motor means for operating said area varying means, control means for said motor means including a control member having a normal position in which said motor means is stationary and effective upon movement from said position in opposite directions to cause operation of said motor means in opposite directions, means for balancing a force produced by the pressure at the entrance to said restriction against a force produced by the pressure at said throat, said balancing means including means for giving said throat pressure force a selected ratio over said entrance pressure force, means connecting said balancing means and said member for positioning the same, said balancing means being effective to position said control member and thereby said area varying means to maintain a constant ratio between said entrance and throat pressures whose magnitude is determined by said selected ratio, an element to be positioned in accordance with the rate of fluid flow thru said restriction, and means connecting said element to said area varying means for concurrent movement therewith.

4. A carburetor for an internal combustion engine, comprising an air conduit, a Venturi restriction in said air conduit, means for varying the cross-sectional area of the throat of said Venturi restriction, motor means for operating said area varying means, means for controlling said motor means to maintain a constant ratio between the pressure at the entrance and the pressure at the throat of said restriction, a fuel conduit, a metering restriction in said fuel conduit, means for varying the fuel pressure differential across said fuel metering restriction to regulate the fuel flow therethru, reversible motor means for operating said fuel pressure differential varying means, control means for said reversible motor means including a control member having a normal position in which said motor means is stationary and effective upon movement from said position in opposite directions to cause operation of said motor means in opposite directions, a shaft for positioning said member, means for operating said shaft including a pair of lever arms fixed thereon, means responsive to said entrance pressure and temperature for applying to one of said levers a force varying directly with said entrance pressure and inversely with said temperature, means for varying the effective length of the lever arm on which said force is applied as a function of the square of said Venturi throat area, means responsive to said air entrance pressure for applying to the other of said lever arms a force varying inversely with said pressure, and means responsive to said fuel pressure differential for varying the effective length of said other lever arm.

5. A carburetor for an internal combustion engine, comprising an air conduit, a restriction in said air conduit, means for varying the cross-sectional area of the throat of said restriction, first motor means for operating said area varying means, means for controlling said motor means to maintain a constant ratio between the pressure at the entrance and the pressure at the throat of said restriction, a fuel conduit, a metering restriction in said fuel conduit, means for varying the fuel pressure differential across said fuel metering restriction to regulate the fuel flow therethru, second motor means, having a pair of expansible chambers separated by a movable wall, for operating said fuel pressure differential varying means, control means for said second motor means including a control member having a normal position in which said second motor means is stationary and effective upon movement from said position in opposite directions to cause operation of said second motor means in opposite directions, a by-pass fuel conduit connected in parallel with said fuel metering restriction, two valves in series in said by-pass conduit, means responsive to the pressure at said air entrance for operating one of said valves, means responsive to the temperature at said air entrance means operated by said temperature responsive means for varying the position of the other of said valves in accordance with an inverse function of the square root of said temperature, means for supplying said expansible chambers with fuel at the pressures upstream and downstream from said one valve, a spring acting on said movable wall in opposition to the difference of said pressures, means movable concurrently with said area varying means for varying the force applied to said wall by said spring in accordance with the square of the area of said air conduit throat, and means including said spring connecting said wall to said control member to position said member.

6. A carburetor for an internal combustion engine, comprising an air conduit, a restriction in said air conduit, means for varying the cross-sectional area of the throat of said restriction, first motor means for operating said area varying means, means for controlling said motor means to maintain a constant ratio between the pressure at the entrance and the pressure at the throat of said restriction, a fuel conduit, a metering restriction in said fuel conduit, means for varying the fuel pressure differential across said fuel metering restriction to regulate the fuel flow therethru, a second motor means, having a pair of expansible chambers separated by a movable wall, for operating said fuel pressure differential varying means, control means for said second motor means including a control member having a normal position in which said second motor means is stationary and effective upon movement from said position in opposite directions to cause operation of said second motor means in opposite directions, a by-pass fuel conduit connected in parallel with said fuel metering restriction, two valves in series in said by-pass conduit, means responsive to the pressure at said air entrance for operating one of said valves, means responsive to the temperature at said air entrance, means including a cam operated by said temperature responsive means for positioning the other of said valves, said cam being contoured so that said other valve is positioned in accordance with an inverse function of the square root of said temperature, means for supplying said expansible chambers with fuel at the pressures upstream and downstream for said one valve, a spring acting on said movable wall in opposition to the difference of said pressures, cam means movable concurrently with said area varying means for varying the force applied to said wall by said spring said cam means being contoured to vary said spring force in accordance with the square of the area of said air conduit restriction throat, means responsive to the ratio of said entrance and throat pressures for applying an additional force to said wall in a direction to aid said spring when said ratio is exceeded and means connecting said member to said wall to be positioned thereby.

7. A carburetor for an internal combustion engine, comprising an air conduit, a restriction in said air conduit, means for varying the cross-sectional area of the throat of said restriction, first motor means for operating said area varying means, means for controlling said motor means to maintain a constant ratio between the pressure at the entrance and the pressure at the throat of said restriction, a fuel conduit, a metering restriction in said fuel conduit, means for varying the fuel pressure differential across said fuel metering restriction to regulate the fuel flow therethru, second motor means for operating said fuel pressure differential varying means, control means for said second motor means including a control member having a normal position in which said second motor means is stationary and effective upon movement from said position in opposite directions to cause operation of said second motor means in opposite directions, a by-pass fuel conduit connected in parallel with said fuel metering restriction, a plurality of restrictions in series in said by-pass conduit, means responsive to the pressure at said air entrance for varying one of said by-pass restrictions, means responsive to the temperature at said air entrance, means operated by said temperature responsive means for varying another of said by-pass restrictions in accordance with an inverse function of the square root of said temperature, means for producing a first force proportional to the pressure drop across one of the restrictions in said by-pass conduit, means for producing a second force acting in opposition to said first force including means movable concurrently with said area varying means for varying said second force in accordance with the square of the area of said air conduit restriction throat, and means responsive to the difference between said first and second forces for positioning said control member.

8. Apparatus for mixing a gas and a liquid so as to maintain a substantially constant ratio between the mass of gas and the mass of liquid in the mixture, comprising a mixing chamber, a conduit for delivering gas to said chamber, a restriction in said conduit, means for varying the cross-sectional area of the throat of said restriction, motor means for operating said area varying means, means for controlling said motor means to maintain a constant ratio between the pressure at the entrance and the pressure at the throat of said restriction, a second conduit for delivering liquid to said chamber, a metering restriction in said second conduit, means for varying the pressure differential across said metering restriction to regulate the flow therethrough, means responsive to the gas pressure at the entrance to the variable restriction, means responsive to the gas temperature at said entrance, a control element, means movable concurrently with said area varying means for positioning said element in accordance with the square of said area, and means including said element, said pressure responsive means and said temperature responsive means for operating said pressure differential varying means to maintain said pressure differential proportional to the product of the square of said entrance pressure times the square of said area divided by said entrance temperature.

9. Apparatus as in claim 8, wherein said mixing chamber is a part of a charge forming device for an internal combustion engine, said gas is air and said liquid is fuel.

10. Apparatus as in claim 8, including means responsive to acceleration of said engine for temporarily increasing the fuel pressure differential.

11. Apparatus as in claim 8; wherein said means for operating said pressure differenial varying means includes fluid motor means having control valve means for selectively supplying fluid to or draining fluid from said motor means, and comprising a throttle for controlling the flow of air through the air conduit, the pump means responsive to opening movement of said throttle for withdrawing fluid from said fluid motor means to cause a temporary increase in said fuel pressure differential.

12. Apparatus as in claim 8, in which said means for controlling said motor means includes a control member having a normal position in which said motor means is stationary and effective upon movement from said position in opposite directions to cause operation of said motor means in opposite directions, means responsive to the gas pressure at said throat, second means responsive to the gas pressure at said entrance, means for balancing a force produced by said throat pressure responsive means against a force produced by said second entrance pressure responsive means, said balancing means including means for giving said throat pressure force a mechanical advantage over said entrance pressure force, means connecting said balancing means to said control member for positioning the same, said balancing means being effective to position said control member and thereby said area varying means to maintain a constant ratio between said entrance and throat pressure whose magnitude is determined by said mechanical advantage.

13. Apparatus as in claim 8, in which said pressure differential varying means includes reversible motor means, control means for said reversible motor means including a control member having a normal position in which said motor means is stationary and effective upon movement from said position in opposite directions to cause operation of said motor means in opposite directions, a shaft for positioning said member, means for operating said shaft including a pair of lever arms fixed thereon, means responsive to said entrance pressure and temperature for applying to one of said levers a force varying directly with said entrance pressure and inversely with said temperature, means for varying the effective length of the lever arm on which said force is applied as a function of the square of said Venturi throat area, means responsive to said air entrance pressure for applying to the other of said lever arms a force varying inversely with said pressure, and means responsive to said fuel pressure differential for varying the effective length of said other lever arm.

14. Apparatus as in claim 8, in which said pressure differential varying means includes reversible motor means having a pair of expansible chambers separated by a movable wall, control means for said reversible motor means including a control member having a normal position in which said motor means is stationary and effective upon movement from said position in opposite directions to cause operation of said motor means in opposite directions, a by-pass fuel conduit connected in parallel with said fuel metering restriction, two valves in series in said by-pass conduit, means responsive to the pressure at said air entrance for operating one of said valves, means responsive to the temperature at said air entrance, means operated by said temperature responsive means for varying the opening of the other of said valves in accordance with an inverse function of the square root of said temperature, means for supplying said expansible chambers with fuel at the pressures upstream and downstream from said one valve, a spring acting on said movable wall in opposition to the difference of said pressures, means movable concurrently with said area varying means for varying the force applied to said wall by said spring in accordance with the square of the area of said air conduit throat, and means including said spring connecting said wall to said control member to position said member.

JOHN H. STRESEN-REUTER.

REFERENCES CITED

The following references are of record in the file of this patent:

UNITED STATES PATENTS

| Number | Name | Date |
| --- | --- | --- |
| 1,487,402 | Roucka | Mar. 18, 1924 |
| 2,165,447 | Browne | July 11, 1939 |

(Other references on following page)

UNITED STATES PATENTS

| Number | Name | Date |
|---|---|---|
| 2,281,411 | Campbell | Apr. 28, 1942 |
| 2,341,257 | Wunsch | Feb. 8, 1944 |
| 2,361,227 | Mock | Oct. 24, 1944 |
| 2,367,176 | Ahlstrom et al. | Jan. 16, 1945 |

FOREIGN PATENTS

| Number | Country | Date |
|---|---|---|
| 363,339 | Great Britain | June 13, 1930 |

OTHER REFERENCES

Ser. No. 315,385, Wunsch (A. P. C.), published June 1, 1943.

Ser. No. 394,322, Gosslau et al. (A. P. C.), published May 25, 1943.